US012557536B2

(12) United States Patent
Li et al.

(10) Patent No.: US 12,557,536 B2
(45) Date of Patent: Feb. 17, 2026

(54) TOUCH DISPLAY PANEL AND TOUCH DISPLAY DEVICE

(71) Applicants: Chongqing BOE Display Technology Co., Ltd., Chongqing (CN); BOE TECHNOLOGY GROUP CO., LTD., Beijing (CN)

(72) Inventors: Jie Li, Beijing (CN); Dawei Shi, Beijing (CN); Wei Zhang, Beijing (CN); Zhijian Qi, Beijing (CN); Binbin Ma, Beijing (CN); Yuqun Lu, Beijing (CN); Yuling Chen, Beijing (CN); Tongwei Xu, Beijing (CN); Xinsong Tang, Beijing (CN); Yilin Xu, Beijing (CN); Linjie Zhang, Beijing (CN); Yanqiang Wang, Beijing (CN); Yunhao Wang, Beijing (CN); Fang Zhang, Beijing (CN); Yuanzheng Guo, Beijing (CN); Wei Xia, Beijing (CN)

(73) Assignees: Chongqing BOE Display Technology Co., Ltd., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 423 days.

(21) Appl. No.: 18/023,875

(22) PCT Filed: Mar. 31, 2022

(86) PCT No.: PCT/CN2022/084296
§ 371 (c)(1),
(2) Date: Feb. 28, 2023

(87) PCT Pub. No.: WO2023/184306
PCT Pub. Date: Oct. 5, 2023

(65) Prior Publication Data
US 2024/0292722 A1 Aug. 29, 2024

(51) Int. Cl.
*H10K 59/80* (2023.01)
*G06F 3/041* (2006.01)
(Continued)

(52) U.S. Cl.
CPC ....... *H10K 59/8792* (2023.02); *G06F 3/0412* (2013.01); *G06F 3/0445* (2019.05);
(Continued)

(58) Field of Classification Search
CPC ...... G06F 3/041–047; G06F 2203/041–04114; H10K 59/40;
(Continued)

(56) References Cited

U.S. PATENT DOCUMENTS

2020/0303684 A1* 9/2020 Kim ................. H10K 59/12
2021/0005845 A1* 1/2021 Kim ................. G06F 3/0412
2022/0206636 A1* 6/2022 Lu .................... G06F 3/0412

FOREIGN PATENT DOCUMENTS

CN 111668277 A * 9/2020 ........... G06F 3/0412
CN 112698746 A 4/2021
(Continued)

*Primary Examiner* — Sanjiv D. Patel
(74) *Attorney, Agent, or Firm* — HOUTTEMAN LAW LLC

(57) ABSTRACT

There are provided a touch display panel and a touch display device, the touch display panel includes: a display substrate including a plurality of pixel regions and a spacer region spacing the plurality of pixel regions apart from each other; a black matrix located on a light-exiting side of the display substrate, an orthographic projection of the black matrix on the display substrate being located in the spacer region; and a touch control structure layer including a first touch pattern layer located on the light-exiting side of the display substrate, the first touch pattern layer including a plurality of first metal lines, where an orthographic projection of each first metal line on the display substrate is located in the (Continued)

orthographic projection of the black matrix on the display substrate, and the first metal lines are in contact with the black matrix.

19 Claims, 10 Drawing Sheets

(51) Int. Cl.
*G06F 3/044* (2006.01)
*H10K 59/40* (2023.01)
*H10K 59/121* (2023.01)

(52) U.S. Cl.
CPC .... *H10K 59/40* (2023.02); *G06F 2203/04112* (2013.01); *H10K 59/121* (2023.02)

(58) Field of Classification Search
CPC .. H10K 59/8792; H10K 59/126; H10K 59/38; H10K 59/873; G02F 1/133512; G02F 1/13338; G02F 1/13394
See application file for complete search history.

(56) References Cited

FOREIGN PATENT DOCUMENTS

| | | | | |
|---|---|---|---|---|
| CN | 113644219 A | * | 11/2021 | ............. H10K 59/40 |
| CN | 114690946 A | | 7/2022 | |
| JP | 2011170252 A | | 9/2011 | |

\* cited by examiner

TOUCH DISPLAY PANEL AND TOUCH DISPLAY DEVICE

TECHNICAL FIELD

The present disclosure relates to the field of display technology, in particular to a touch display panel and a touch display device.

BACKGROUND

Organic Light-Emitting Diode (OLED) panels have attracted much attention due to their advantages of self-luminescence, low power consumption, lightness and thinness, flexibility, gorgeous colors, high contrast, and fast response speed. In some products, a color filter on encapsulation (COE) is formed on an encapsulation layer of an organic light emitting diode, therefore, it is unnecessary to provide a polarizer to resist reflection. In addition, in some products, a touch control structure layer is arranged on an outer side of the color filter on encapsulation to realize touch control, so that a film layer structure in which multiple functional layers are stacked may be formed.

SUMMARY

The present disclosure provides a touch display panel and a touch display device.

The present disclosure provides a touch display panel, including:
- a display substrate including a plurality of pixel regions and a spacer region spacing the plurality of pixel regions apart from each other;
- a black matrix located on a light-exiting side of the display substrate, an orthographic projection of the black matrix on the display substrate being located in the spacer region;
- a touch control structure layer including a first touch pattern layer located on the light-exiting side of the display substrate, the first touch pattern layer including a plurality of first metal lines, an orthographic projection of each first metal line on the display substrate being located in the orthographic projection of the black matrix on the display substrate, and the first metal lines being in contact with the black matrix.

In some implementations, the black matrix adopts a black single-layered structure.

In some implementations, the touch display panel further includes: a plurality of pixel filter portions, the pixel filter portions have various colors, and each pixel filter portion is arranged opposite to one of the pixel regions of the display substrate;
the black matrix includes a first filter pattern and a second filter pattern, the first filter pattern is located on a side, away from the display substrate, of the first touch pattern layer, the second filter pattern is located on a side, away from the display substrate, of the first filter pattern, and orthographic projections of the first filter pattern and the second filter pattern on the display substrate each cover an orthographic projection of the first touch pattern layer on the display substrate; the first filter pattern includes a plurality of first filter portions, the second filter pattern includes a plurality of second filter portions, and the first filter portions and the second filter portions are arranged opposite to each other in a one-to-one correspondence manner;

materials of the first filter portion and the second filter portion corresponding to each other are respectively the same as materials of the pixel filter portions of two colors.

In some implementations, the black matrix further includes: a light shielding portion, which is of a black single-layered structure and is provided with a via hole therein, the first metal line and at least a portion of the first filter pattern are located in the via hole, and the first metal line is separated from the light shielding portion by the first filter pattern.

In some implementations, at least a portion of the second filter pattern is outside the via hole, and a portion of an orthographic projection of the second filter pattern on the display substrate exceeds an orthographic projection of the via hole on the display substrate.

In some implementations, the first filter portions of the first filter pattern have a same color, or, at least two of the first filter portions have different colors; and
the second filter portions of the second filter pattern have a same color; or, at least two of the second filter portions have different colors.

In some implementations, the first touch pattern layer is located on a side of the black matrix close to the display substrate, and the touch control structure layer further includes:
a second touch pattern layer located on a side, away from the display substrate, of the black matrix and including a plurality of second metal lines, an orthographic projection of each second metal line on the display substrate being located in the orthographic projection of the black matrix on the display substrate.

In some implementations, a refractive index of a surface of the second metal line away from the display substrate is less than 5%.

In some implementations, the touch display panel further includes a cover layer, and an orthographic projection of the cover layer on the display substrate covers each of the pixel regions,
the black matrix has a first surface facing away from the display substrate, a second surface facing the display substrate and a side surface connected between the first surface and the second surface, the side surface of the black matrix includes a first side sub-surface in contact with the cover layer, and a refractive index of a portion of the black matrix close to the first side sub-surface is less than that of the cover layer, so that at least part of light irradiated to the first side sub-surface from the display substrate is reflected by the first side sub-surface towards a direction away from the display panel.

In some implementations, the cover layer is a continuous film layer;
or, the cover layer includes a plurality of cover portions arranged at intervals, and an orthographic projection of each cover portion on the display substrate covers at least one of the pixel regions.

In some implementations, the first touch pattern layer is located on a side of the black matrix close to the display panel, and the touch display panel further includes:
a second touch pattern layer located on a side, close to the display substrate, of the first touch pattern layer and including a plurality of second metal lines, an orthographic projection of each second metal line on the display substrate being located in the orthographic projection of the black matrix on the display substrate;

an insulating layer located between the first touch pattern layer and the second touch pattern layer, an orthographic projection of the insulating layer on the display substrate being located in the spacer region.

In some implementations, the touch display panel further includes a cover layer, and an orthographic projection of the cover layer on the display substrate covers each of the pixel regions, the insulating layer has a first surface facing away from the display substrate, a second surface facing the display substrate and a side surface connected between the first surface and the second surface, the side surface of the insulating layer includes a first side sub-surface in contact with the cover layer, and a refractive index of the insulating layer is less than that of the cover layer, so that at least part of light irradiated to the first side sub-surface from the display substrate is reflected by the first side sub-surface towards a direction away from the display substrate.

In some implementations, the cover layer is a continuous film layer;

or, the cover layer includes a plurality of cover portions arranged at intervals, and an orthographic projection of each cover portion on the display substrate covers at least one of the pixel regions.

In some implementations, the touch display panel further includes a plurality of pixel filter portions, each of the pixel filter portions is disposed opposite to one of the pixel regions of the display substrate, the display substrate includes:
 a base substrate;
 a plurality of light emitting devices disposed on the base substrate, each pixel region being provided therein with one of the light emitting devices;
 an encapsulation layer arranged on a side, away from the base substrate, of the light emitting devices,
the plurality of pixel filter portions are in contact with the encapsulation layer.

In some implementations, the encapsulation layer includes: a first inorganic encapsulation sub-layer, an organic encapsulation sub-layer, and a second inorganic encapsulation sub-layer sequentially arranged in a direction away from the base substrate, the second inorganic encapsulation sub-layer is a continuous film layer, an orthographic projection of the second inorganic encapsulation sub-layer on the display substrate covers the plurality of pixel regions, and the plurality of pixel filter portions are in contact with the second inorganic encapsulation sub-layer;

or, the second inorganic encapsulation sub-layer is provided with a plurality of hollow-out portions therein, the hollow-out portions correspond to the pixel regions one by one, and at least a portion of the pixel filter portions are in contact with the organic encapsulation sub-layer through the hollow-out portions.

The present disclosure further provides a touch display device, including the touch display panel mentioned above.

BRIEF DESCRIPTION OF DRAWINGS

The accompanying drawings, which are included to provide a further understanding of the disclosure and are incorporated in and constitute a part of this specification, illustrate embodiments of the present disclosure and together with the description serve to explain the present disclosure, but do not constitute a limitation of the present disclosure.

DETAIL DESCRIPTION OF EMBODIMENTS

Figure 1A:
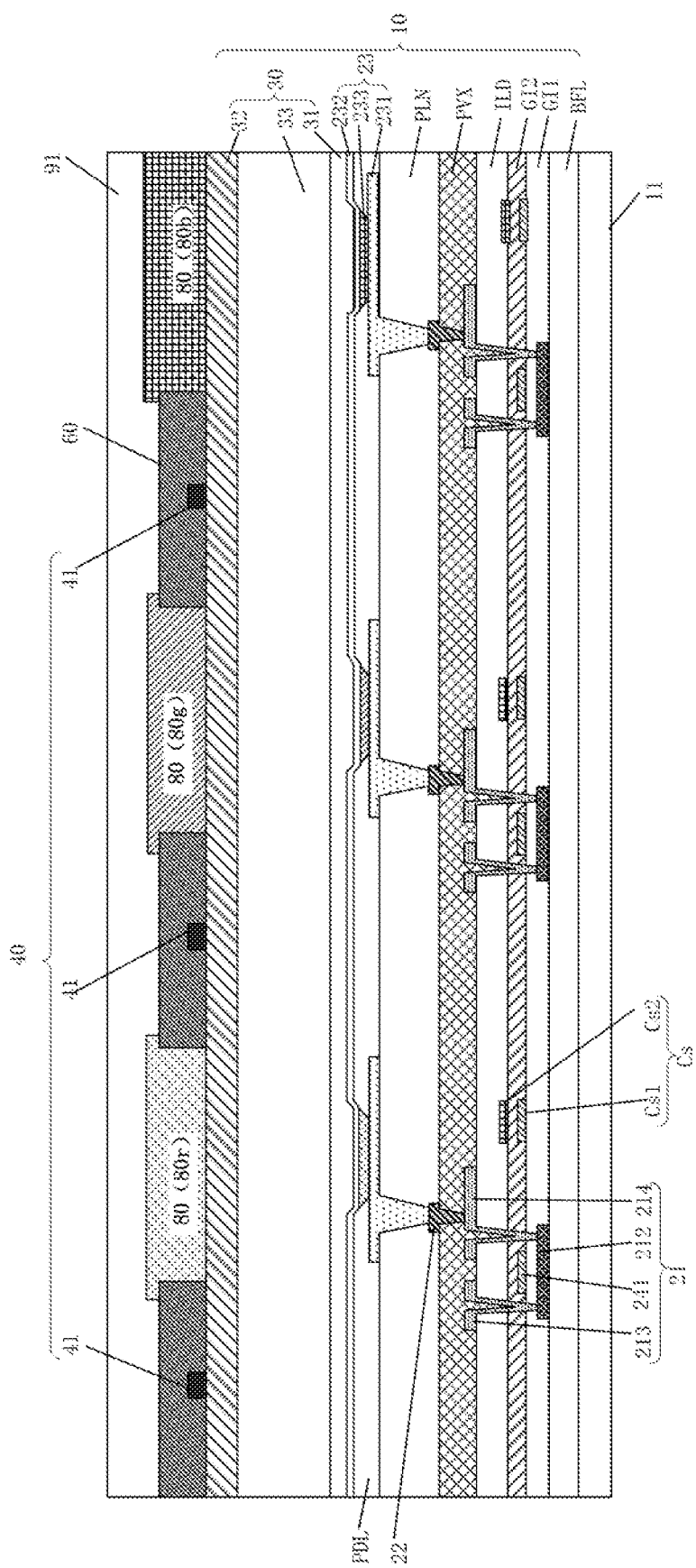
FIG. 1A is a schematic diagram of a touch display panel provided in the present disclosure.

To make the objects, technical solutions and advantages of the embodiments of the present disclosure more apparent, the technical solutions of the embodiments of the present disclosure will be clearly and completely described below with reference to the drawings of the embodiments of the present disclosure. It is to be understood that the described embodiments are only a few embodiments of the present disclosure, and not all the embodiments. All other embodiments, which can be derived by a person skilled in the art from the described embodiments of the disclosure without creative effort, are within the protective scope of the present disclosure.

Unless defined otherwise, technical or scientific terms used herein shall have the ordinary meaning as understood by one of ordinary skill in the art to which this disclosure belongs. The use of "first," "second," and the like in this disclosure is not intended to indicate any order, quantity, or importance, but rather is used to distinguish one element from another. Also, the use of the terms "a," "an," or "the" and similar referents does not denote a limitation of quantity, but rather denotes the presence of at least one. The word "comprising/including" or "comprises/includes", and the like, means that the element or item preceding the word contains the element or item listed after the word and its equivalent, but does not exclude other elements or items. The terms "connected" or "coupled" and the like are not restricted to physical or mechanical connections, but may include electrical connections, whether direct or indirect. Terms "upper/on", "lower/below", "left", "right", and the like are used only to indicate relative positional relationships, and when an absolute position of an object being described is changed, the relative positional relationships may be changed accordingly.

In the following description, when an element or layer is referred to as being "on" or "connected to" another element or layer, the element or layer may be directly on another element or layer, directly connected to another element or layer, or there may be an intervening element or intervening layer present therebetween. However, when an element or layer is referred to as being "directly on" or "directly connected to" another element or layer, there is no intervening element or layer present therebetween. The term "and/or" includes any and all combinations of one or more of the associated listed items.

Organic Light-Emitting Diode (OLED) panels have attracted much attention due to their advantages of self-luminescence, low power consumption, lightness and thinness, flexibility, gorgeous colors, high contrast, and fast response speed. In some products, a color filter on encapsulation (COE) and a black matrix are formed on an encapsulation layer of an organic light emitting diode, therefore, it is unnecessary to provide a polarizer to resist reflection. In addition, in some products, a touch control structure layer is arranged on the encapsulation layer to realize touch control, so that a film layer structure in which multiple functional layers are stacked may be formed. Generally, in the process of manufacturing a display panel, a touch control structure layer is first formed on an encapsulation layer, then a planarization layer is formed, and next a color filter on encapsulation and a black matrix are formed on a side of the planarization layer away from the encapsulation layer. However, this results in a complicated process, and when the black matrix is far away from the organic light emitting diode, L-Decay of the organic light emitting diode is accelerated, and a color shift phenomenon easily occurs.

FIG. 1A is a schematic diagram of a touch display panel provided in the present disclosure, as shown in FIG. 1A, the touch display panel includes: a display substrate 10, a black matrix 60 and a touch control structure layer.

Figure 1B:
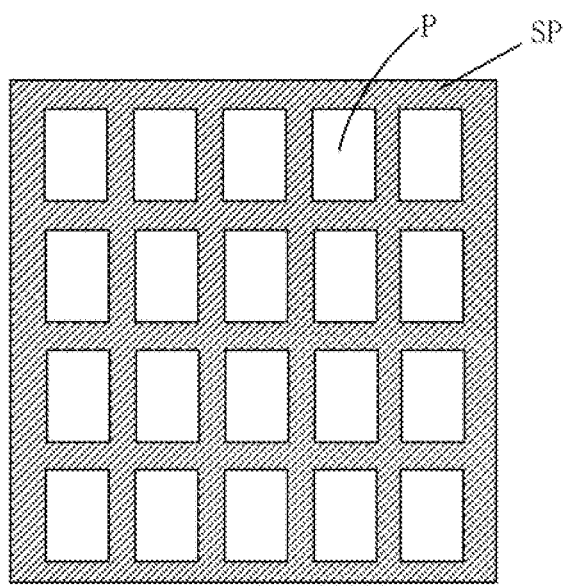
FIG. 1B is a schematic diagram illustrating a region division of a display substrate provided in the present disclosure.

The display substrate 10 may be an OLED display substrate, and FIG. 1B is a schematic diagram illustrating a region division of the display substrate provided in the present disclosure, as shown in FIG. 1B, the display substrate includes a plurality of pixel regions P and a spacer region SP that separates the plurality of pixel regions P from each other. It should be noted that the number and arrangement of the pixel regions P in FIG. 1B are only exemplary.

In some implementations, the display substrate 10 may specifically include a base substrate 11 and a plurality of light emitting devices 23 disposed on the base substrate 11, each pixel region P is provided therein with one of the light emitting devices 23, and the light emitting devices 23 may be OLED devices, LED devices, or the like.

The black matrix 60 is located on a light-exiting side of the display substrate 10, i.e., on a side of the plurality of light emitting devices 23 away from the base substrate 11. An orthogonal projection of the black matrix 60 on the display substrate 10 is located in the spacer region SP. The black matrix 60 may have a mesh structure, and each mesh of the black matrix 60 corresponds to one pixel region P of the display substrate 10.

In the embodiment of the present disclosure, the black matrix 60 may be made of a black material, or may be made of other materials, as long as crosstalk of light exited from different pixel regions P can be prevented.

The touch control structure layer is located on the light-exiting side of the display substrate 10 for sensing a touch position. The touch control structure layer includes a first touch pattern layer 40, the first touch pattern layer 40 includes a plurality of first metal lines 41, an orthographic projection of each first metal line 41 on the display substrate 10 is located within an orthographic projection of the black matrix 60 on the display substrate 10, and the first metal lines 41 are in contact with the black matrix 60. The first touch pattern layer 40 may be located on a side of the black matrix 60 close to the display substrate 10.

In some implementations, the first touch pattern layer 40 may include a plurality of self-capacitance electrodes, each of the self-capacitance electrodes includes multiple first metal lines 41. In other implementations, the touch control structure layer includes a first touch pattern layer 40 and a second touch pattern layer, the first touch pattern layer 40 includes a plurality of touch driving electrodes, the second touch pattern layer includes a plurality of touch sensing electrodes, the touch driving electrodes are intersected with the touch sensing electrodes, and are insulated and spaced apart from the touch sensing electrodes, each touch driving electrode is a metal mesh electrode formed by multiple first metal lines 41, and each touch sensing electrode is a metal mesh electrode formed by a plurality of second metal lines. Alternatively, the touch control structure layer includes a plurality of touch driving electrodes and a plurality of touch sensing electrodes, and each touch driving electrode includes a plurality of driving electrode units and connecting portions located between every two adjacent driving electrode units; each touch sensing electrode includes a plurality of sensing electrode units and bridge portions located between every two adjacent sensing electrode units, the driving electrode units, the connecting portions and the sensing electrode units are all located in the first touch pattern layer 40 and each have a metal mesh structure formed by multiple first metal lines, and the bridge portions are located in the second touch pattern layer and each have a metal mesh structure formed by multiple second metal lines; certainly, the driving electrode units, the connecting portions, and the sensing electrode units may be disposed in the second touch pattern layer, and the bridge portions may be disposed in the first touch pattern layer 40.

In the embodiment of the present disclosure, each first metal line 41 in the first touch pattern layer 40 is in contact with the black matrix 60, that is, no other spacer layer is provided between the first metal line 41 of the first touch pattern layer 40 and the black matrix 60, so as to simplify the structure of the touch display panel and simplify the manufacturing process thereof. Furthermore, a distance between the black matrix 60 and the light emitting device 23 can be reduced, thereby avoiding acceleration of L-Decay of the light emitting device 23 and color shift of the touch display panel.

As shown in FIG. 1A, the touch display panel may further include: a plurality of pixel filter portions 80, the pixel filter portions 80 have various colors, and each pixel filter portion 80 is disposed opposite to one of the pixel regions P of the display substrate 10, that is, an orthogonal projection of each pixel filter portion 80 on the display substrate 10 at least partially overlaps with one of the pixel regions. For example, the plurality of pixel regions P are divided into a plurality of pixel units each including a red pixel region, a green pixel region, and a blue pixel region, and the plurality of pixel filter portions 80 may include: a red pixel filter portion 80r corresponding to the red pixel region, a blue pixel filter portion 80b corresponding to the blue pixel region, and a green pixel filter portion 80g corresponding to the green pixel region.

In some implementations, as shown in FIG. 1A, the black matrix 60 has a black single-layered structure, for example, the black matrix 60 is made of a black organic material.

In a case where the first touch pattern layer 40 includes the plurality of self-capacitance electrodes, and each of the self-capacitance electrodes includes multiple first metal lines 41, the black matrix 60 with the black single-layered structure may be located on a side of the first touch pattern layer 40 away from the display substrate 10.

As shown in FIG. 1A, the touch display panel further includes a cover layer 91, and an orthogonal projection of the cover layer 91 on the display substrate 10 covers each pixel region. The cover layer 91 may be a continuous entire structure, or may be a discontinuous structure, for example, the cover layer 91 includes a plurality of cover portions, and an orthogonal projection of each cover portion on the display substrate 10 covers at least one pixel region. The cover layer 91 may be made of an inorganic insulating material or an organic insulating material.

Figure 2A:
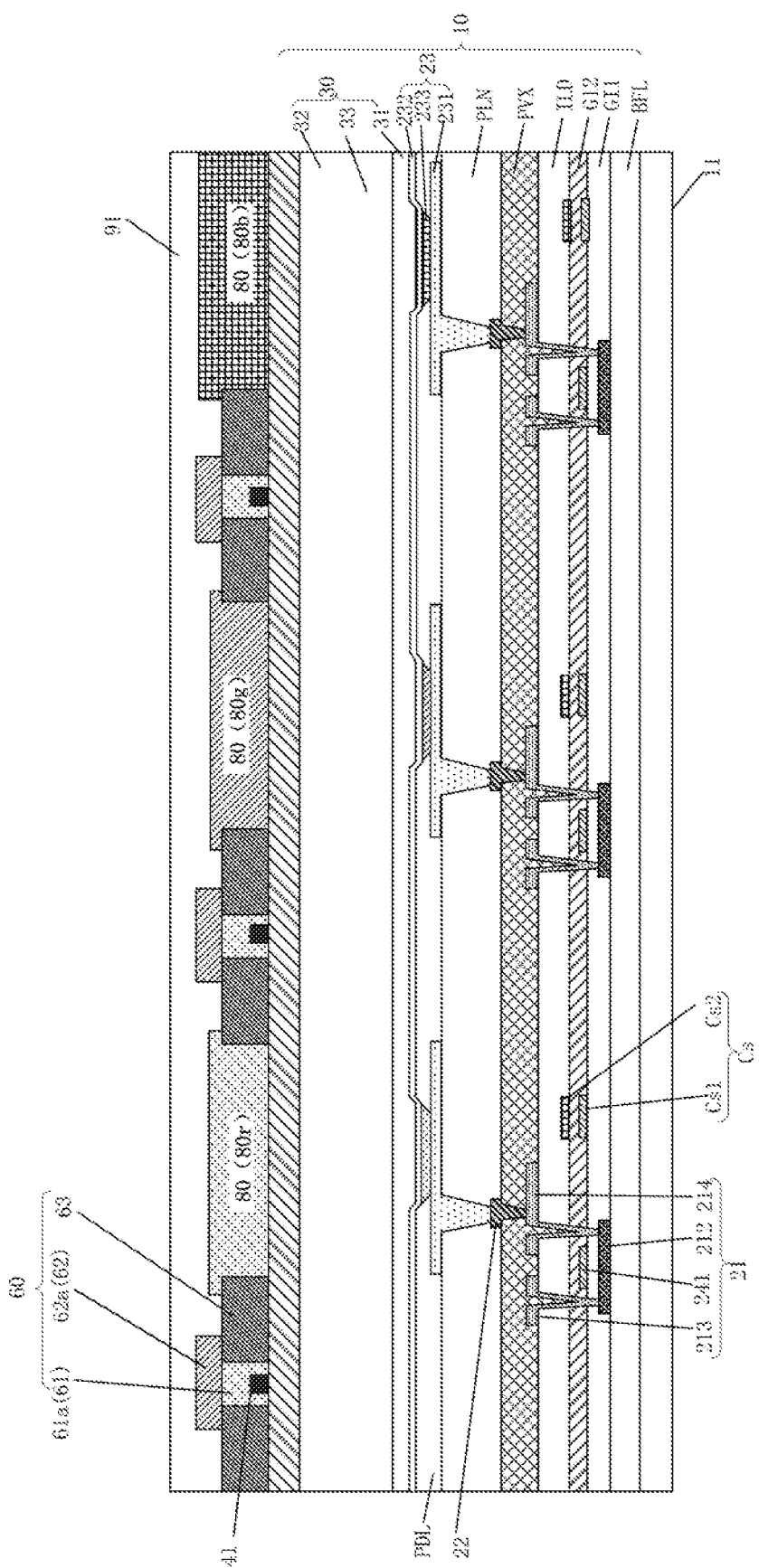
FIG. 2A is a schematic diagram of a touch display panel provided in the present disclosure.
Figure 2B:
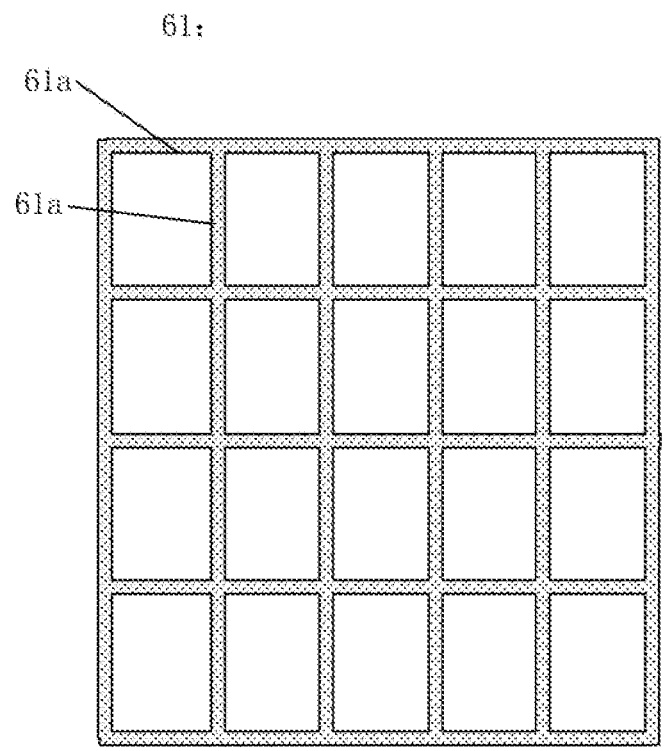
FIG. 2B is a bottom view of a first filter pattern and a second filter pattern provided in the present disclosure.
Figure 2B:
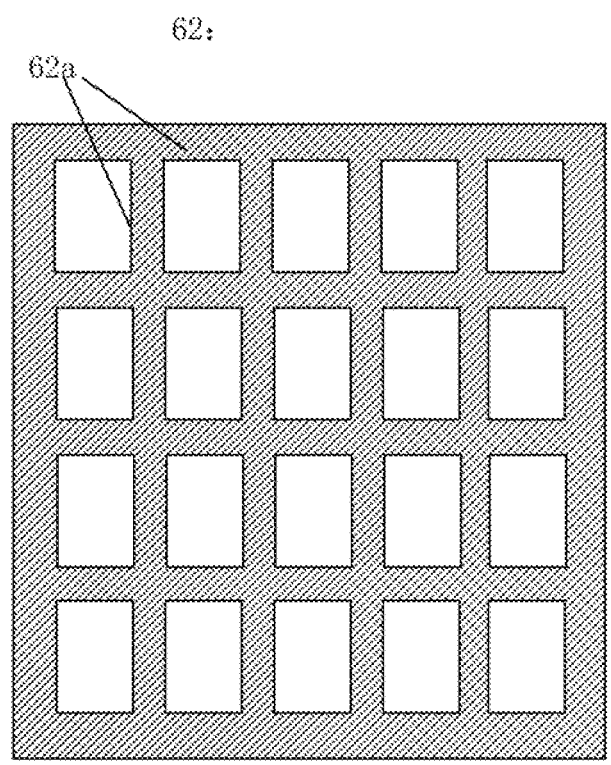

FIG. 2A is a schematic diagram of a touch display panel provided in the present disclosure, and FIG. 2B is a bottom view of a first filter pattern and a second filter pattern provided in the present disclosure, as shown in FIGS. 2A and 2B, in some implementations, the black matrix 60 may include a first filter pattern 61 and a second filter pattern 62, the first filter pattern 61 is located on a side of the first touch pattern layer away from the display substrate 10, the second filter pattern 62 is located on a side of the first filter pattern 61 away from the display substrate 10, orthographic projections of the first filter pattern 61 and the second filter pattern 62 on the display substrate 10 each cover an orthographic projection of the first touch pattern layer 40 on the display substrate 10, the first filter pattern 61 includes a plurality of first filter portions 61a, the second filter pattern 62 includes a plurality of second filter portions 62a, and the first filter portions 61a and the second filter portions 62a are arranged in a one-to-one correspondence. For example, in a case where the plurality of pixel regions are arranged in a plurality of rows and a plurality of columns, as shown in FIG. 2B, each first filter portion 61a and each second filter portion 62a are of a stripe structure, and the plurality of first filter portions 61a are crisscrossed to form a mesh structure; the plurality of second filter portions 62a are crisscrossed to form a mesh structure. Certainly, the first filter portions 61a and the second filter portions 62a may be in other shapes.

Materials of the first filter portion 61a and the second filter portion 62a corresponding to each other are respectively the same as materials of the pixel filter portions 80 of two colors.

That is, for any pair of the first filter portion 61a and the second filter portion 62a corresponding to each other, the first filter portion 61a is made of the same material as the pixel filter portion of one color, and the second filter portion 62a is made of the same material as the pixel filter portion 80 of another color. Alternatively, the first filter pattern 61 may include a plurality of first filter portions 61a, and the second filter pattern 62 may include a plurality of second filter portions 62a, and the plurality of first filter portions 61a may have a same color or not all the first filter portions 61a have the same color; the plurality of second filter portions 62a may have a same color or not all the second filter portions 62a have the same color. For example, for one pair of the first filter portion 61a and the second filter portion 62a corresponding to each other, the materials of the first filter portion 61a and the second filter portion 62a are respectively the same as the materials of the red pixel filter portion 80r and the green pixel filter portion 80g; the materials of another pair of the first filter portion 61a and the second filter portion 62a corresponding to each other are respectively the same as those of the red pixel filter portion 80r and the blue pixel filter portion 80b.

In this case, the first filter portion 61a and the second filter portion 62a are respectively configured to transmit light of different colors, so that a lamination of the first filter pattern 61 and the second filter pattern 62 can also play a role of shielding light, and in the process of manufacturing the touch display panel, the first filter portion 61a may be manufactured in synchronization with the pixel filter portion 80 made of the same material as the first filter portion 61a, and the second filter portion 62a may be manufactured in synchronization with the pixel filter portion 80 made of the same material as the second filter portion 62a, so that it is unnecessary to separately manufacture the first filter portion 61a and the second filter portion 62a, thereby simplifying the manufacturing process.

As shown in FIG. 2A, the black matrix 60 may further include: a light shielding portion 63 adopting a black single-layered structure, the light shielding portion 63 has a via hole therein, and the first metal line 41 and at least a part of the first filter pattern 61 are located in the via hole, so that the first metal line 41 is separated from the light shielding portion 63.

A material of the light shielding portion 63 may contain a metal element (e.g., Cr element) so that the black matrix 60 can have a high optical density (OD) value and a high impedance, but in this case, the light-shielding portion 63 also has a certain weak conductivity. In the embodiment shown in FIG. 2A, the first filter pattern 61 separates the first metal line 41 from the light shielding portion 63, so that, with the structure shown in FIG. 2A, the manufacturing process can be simplified, and the weak conductivity of the light shielding portion 63 can be prevented from affecting the effect of touch detection.

As shown in FIG. 2A, at least a portion of the second filter pattern 62 may be located outside the via hole, and a portion of an orthographic projection of the second filter pattern 62 on the display substrate 10 exceeds an orthographic projection of the via hole on the display substrate 10, so as to ensure the light shielding effect of the black matrix 60.

In some implementations, materials and colors of the first filter portions 61a may be the same, and the first filter portions 61a are connected together (formed into one piece), and materials and colors of the second filter portions 62a may be the same, and the second filter portions 62a may be connected together (formed into one piece).

Figure 2C:
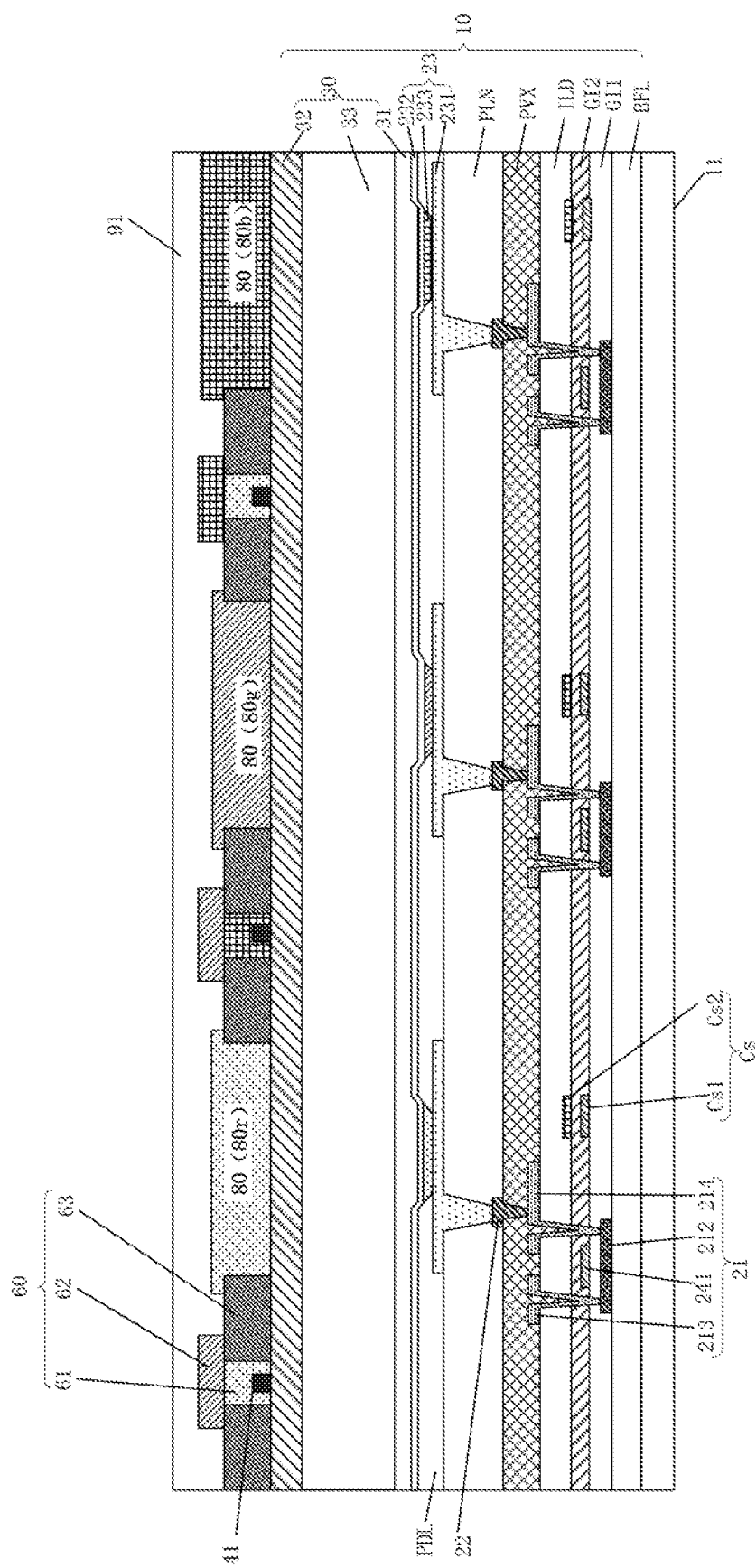
FIG. 2C is a schematic diagram of a touch display panel provided in the present disclosure.

FIG. 2C is a schematic diagram of a touch display panel provided in the present disclosure, and the touch display panel shown in FIG. 2C is substantially the same as the touch display panel shown in FIG. 2A except that in FIG. 2C, at least two of the first filter portions 61a have different colors, and at least two of the second filter portions 62A have different colors. In FIG. 2C, the first filter portions 61a of different colors are indicated by different section lines, and the second filter portions 62a of different colors are indicated by different section lines.

In touch display panels shown in FIGS. 1A, 2A and 2C, structures of display substrates 10 may be the same, and specifically, as shown in FIGS. 1A, 2A and 2C, each display substrate 10 includes: a base substrate 10, and a plurality of light emitting devices 23 disposed on the base substrate 10, each pixel region is provided therein with one light emitting device 23. In addition, the display substrate 10 further includes a plurality of pixel driving circuits disposed between the base substrate 11 and the light emitting devices 23, the pixel driving circuits correspond to the light emitting devices 23 one by one, and the pixel driving circuits are configured to provide driving currents for the light emitting devices 23 to drive the light emitting devices 23 to emit light. For example, each pixel driving circuit includes a plurality of thin film transistors 21 and at least one capacitor Cs.

As shown in FIGS. 1A, FIG. 2A and FIG. 2C, the thin film transistor 21 includes a gate electrode 211, an active layer 212, a source electrode 213 and a drain electrode 214, and taking the thin film transistor 21 being a top-gate type thin film transistor as an example, the active layer 212 is located between the gate electrode 211 and the base substrate 11. A material of the active layer 212 may include, for example, an inorganic semiconductor material (e.g., polysilicon, amorphous silicon and the like), an organic semiconductor material, or an oxide semiconductor material. The active layer 212 includes a channel portion, a source connection portion and a drain connection portion at both sides of the channel portion, the source connection portion is connected to the source electrode 213 of the thin film transistor 21, and the drain connection portion is connected to the drain electrode 214 of the thin film transistor 21. Each of the source connection portion and the drain connection portion may be doped with impurities (e.g., N-type impurities or P-type impurities) having a higher impurity concentration than that for the channel portion. The channel portion is directly opposite to the gate electrode 211 of the thin film transistor 21, and in response to that a voltage signal applied to the gate electrode 211 reaches a predetermined value, a carrier path is formed in the channel portion, so that the source electrode 213 and the drain electrode 214 of the thin film transistor 21 are conducted, that is, a current is allowed between the source electrode 213 and the drain electrode 214 of the thin film transistor 21.

A buffer layer BFL is disposed between the thin film transistor 21 and the base substrate 11, and configured to prevent or reduce diffusion of metal atoms and/or impurities from the base substrate 11 into the active layer 212 of the thin film transistor 21. The buffer layer BFL may include an inorganic material such as silicon oxide, silicon nitride, and/or silicon oxynitride, and may be formed as a multi-layered structure or a single-layered structure.

A first gate insulating layer GI1 is disposed on a side of the active layer 212 away from the base substrate 11. A material of the first gate insulating layer GI1 may include a silicon compound or a metal oxide. For example, the material of the first gate insulating layer GI1 includes silicon oxynitride, silicon oxide, silicon nitride, silicon oxycarbide, silicon carbonitride, aluminum oxide, aluminum nitride, tantalum oxide, hafnium oxide, zirconium oxide, titanium oxide, or the like. In addition, the first gate insulating layer GI1 may be of a single-layered structure or a multi-layered structure.

The gate electrode 211 of the thin film transistor 21 and the first electrode plate Cs1 of the capacitor Cs are disposed in a same layer and located on a side of the first gate insulating layer GI1 away from the base substrate 11. Materials of the gate electrode 211 of the thin film transistor and the first electrode plate Cs1 of the capacitor Cs may include, for example, metal, metal alloy, metal nitride, conductive metal oxide, transparent conductive material, or the like.

A second gate insulating layer GI2 is disposed on a side of the gate electrode 211 of the thin film transistor away from the base substrate 11, and a material of the second gate insulating layer GI2 may include, for example, silicon oxynitride, silicon oxide, silicon nitride, silicon oxycarbide, silicon carbonitride, or the like.

A second electrode plate Cs2 of the capacitor Cs is disposed on a side of the second gate insulating layer GI2 away from the base substrate 11, and a material of the second electrode plate Cs2 of the capacitor Cs may be the same as that of the first electrode plate Cs1 of the capacitor Cs, which can specifically refer to the conductive materials listed above.

An interlayer insulating layer ILD is disposed on a side of the second electrode plate Cs2 of the capacitor Cs away from the base substrate 11, a material of the interlayer insulating layer ILD may include, for example, a silicon compound, a metal oxide or the like. In particular, the silicon compounds and metal oxides listed above may be selected and will not be described in detail here.

A first source-drain conductive layer is disposed on a side of the interlayer insulating layer ILD away from the base substrate 11. The first source-drain conductive layer may include the source electrode 213 and the drain electrode 214 of each thin film transistor, the source electrode 213 is electrically connected to the source connection portion, and the drain electrode 214 is electrically connected to the drain connection portion. The first source-drain conductive layer may include a metal, an alloy, a metal nitride, a conductive metal oxide, a transparent conductive material, or the like, and for example, the first source-drain conductive layer may be a single-layered structure made of a metal or a multiple-layered structure made of metals, such as Mo/Al/Mo or Ti/Al/Ti.

A passivation layer PVX is disposed on a side of the first source-drain conductive layer away from the base substrate 11, and a material of the passivation layer PVX may include, for example, silicon oxynitride, silicon oxide, silicon nitride, or the like.

A second source-drain conductive layer is disposed on a side of the passivation layer PVX away from the base substrate 11, and may include a conductive structure such as a transfer electrode 22. The second source-drain conductive layer may include a metal, an alloy, a metal nitride, a conductive metal oxide, a transparent conductive material, or the like.

A planarization layer PLN is disposed on a side of the passivation layer PVX away from the base substrate 11, and the planarization layer PLN may be made of an organic insulating material, for example, a resin-based material such as polyimide, epoxy, acryl, polyester, photoresist, polyacrylate, polyamide, or siloxane.

A pixel defining layer PDL is located on a side of the planarization layer PLN away from the base substrate 11, the pixel defining layer PDL has a plurality of pixel openings for accommodating the light emitting devices. Each light emitting device 23 includes: a first electrode 231, a second electrode 232, and a light emitting function layer 233 between the first electrode 231 and the second electrode 232. For example, the first electrode 231 is an anode and the second electrode 232 is a cathode. Alternatively, the first electrode 231 is a reflective electrode made of a metal material, and the second electrode 232 is a transparent electrode made of a transparent conductive material (e.g., indium tin oxide). The light emitting functional layer 233 may include a hole injection layer, a hole transport layer, a light emitting layer, an electron transport layer, and an electron injection layer which are sequentially stacked. The first electrode 231 is located between the pixel defining layer PDL and the planarization layer PLN, and is connected to the transfer electrode 22 through a via hole in the planarization layer PLN, and further connected to the drain electrode 214 of the thin film transistor 21 through the transfer electrode 22. A portion of the first electrode 231 is exposed through the pixel opening. The second electrodes 232 of the light emitting devices 23 may be formed into an integral structure (formed into one piece).

In some implementation, the light emitting device 23 is an OLED device, in such case, the light emitting layer of the light emitting device is made of an organic light emitting material; alternatively, the light emitting device 23 is a QLED (Quantum Dot Light Emitting diode) device, and in this case, the light emitting layer of the light emitting device is made of a quantum dot light emitting material. Each light emitting device 23 emits light of the same color as that of the pixel filter portion corresponding thereto.

As shown in FIG. 1A, FIG. 2A and FIG. 2C, the display substrate 10 may further include an encapsulation layer 30, and the encapsulation layer 30 covers the pixel defining layer PDL and the plurality of light emitting devices 23, and is configured to encapsulate the light emitting devices 23 so as to prevent moisture and/or oxygen in the external environment from corroding the light emitting devices 23. In some implementations, the encapsulation layer 30 includes a plurality of encapsulation sub-layers that are stacked, for example, the plurality of encapsulation sub-layers includes a first inorganic encapsulation sub-layer 31, a second inorganic encapsulation sub-layer 32 and an organic encapsulation sub-layer 33, the second inorganic encapsulation sub-layer 32 is located on a side, away from the base substrate 11, of the first inorganic encapsulation sub-layer 31, and the organic encapsulation sub-layer 33 is located between the first inorganic encapsulation sub-layer 31 and the second inorganic encapsulation sub-layer 32. The first inorganic encapsulation sub-layer 31 and the second inorganic encapsulation sub-layer 32 both may be made of an inorganic material with a high-density, such as silicon oxynitride, silicon oxide, or silicon nitride. The organic encapsulation sub-layer 33 may be made of a polymer material containing a desiccant or a polymer material that can block moisture. For example, the organic encapsulation sub-layer 33 is made of a polymer resin, so that a stress of the first inorganic encapsulation sub-layer 31 and the second inorganic encapsulation sub-layer 32 can be relieved, and a water-absorbing material such as a desiccant may be further included to absorb water molecules and/or oxygen molecules intruding thereinto.

In some implementations, the display substrate 10 may further include a spacer layer (not shown) between the pixel defining layer PDL and the encapsulation layer 30, and the spacer layer may further enlength a path of external moisture or oxygen entering the display region, so as to protect the light emitting devices 23 in the display region.

In the touch display panels shown in FIG. 1, FIG. 2A and FIG. 2C, the second inorganic encapsulation sub-layer 32 may be a continuous entire film layer, and a buffer layer may be disposed between the first touch pattern layer 40 and the encapsulation layer 30; certainly, the first touch pattern layer 40 and the pixel filter portion 80 may be directly disposed on the encapsulation layer 30 and in contact with the second inorganic encapsulation sub-layer 32, so that an overall thickness of the touch display panel may be reduced; and the distance between the black matrix 60 and the light emitting devices 23 can be reduced, thereby the problems of too fast L-Decay and color shift of the light emitting devices can be improved.

Figure 3:
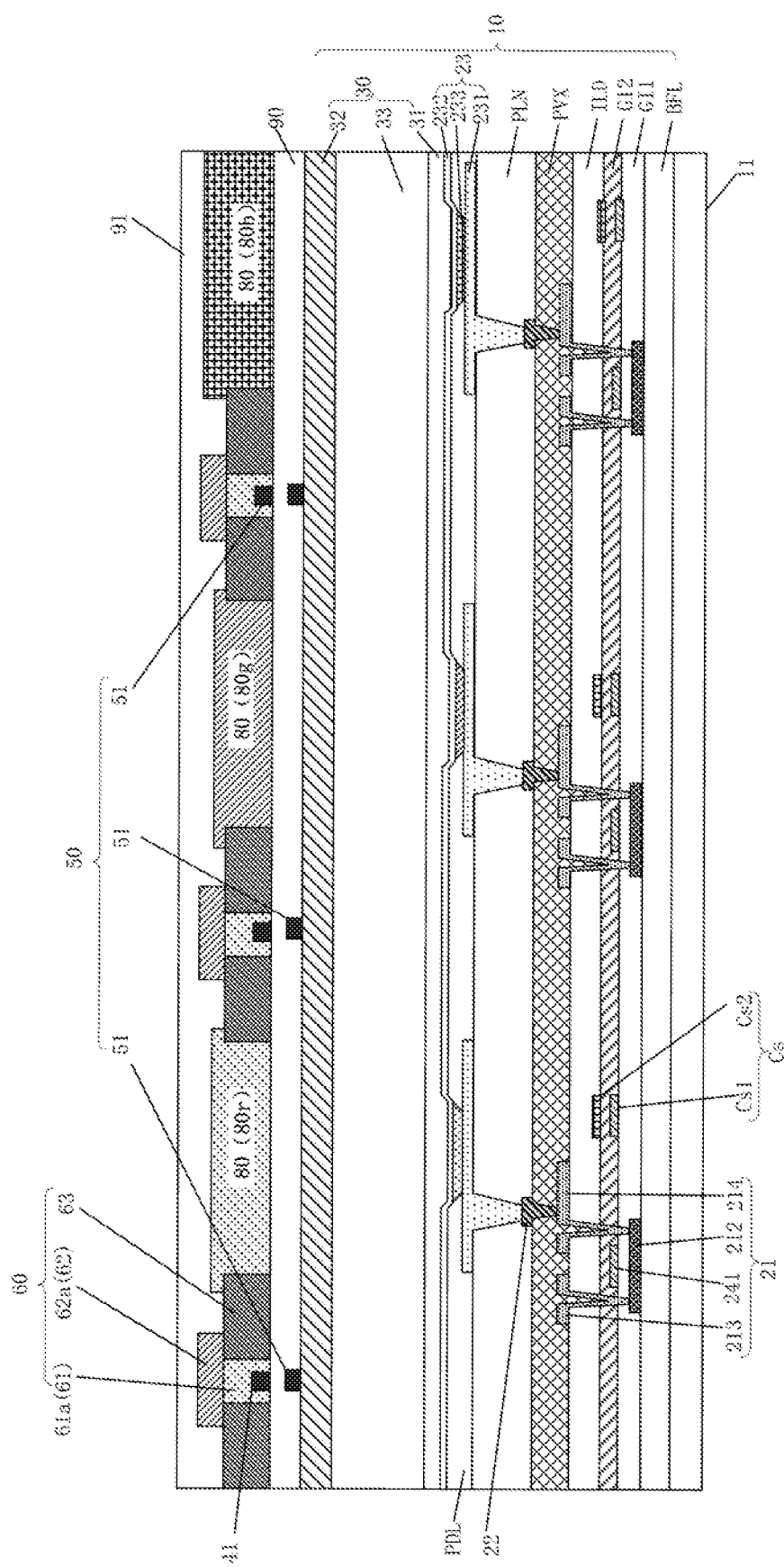
FIG. 3 is a schematic diagram of a touch display panel provided in the present disclosure.

FIG. 3 is a schematic diagram of a touch display panel provided in the present disclosure, and the touch display panel shown in FIG. 3 is similar to the touch display panel shown in FIG. 2A, except that the touch control structure layer in the touch display panel shown in FIG. 3 may further include, in addition to the first touch pattern layer 40, a second touch pattern layer 50. The second touch pattern layer 50 is located on a side of the first touch pattern layer 40 close to the display substrate 10, and includes a plurality of second metal lines 51, and an orthographic projection of each second metal line 51 on the display substrate 10 is located within the orthographic projection of the black matrix 60 on the display substrate 10.

As shown in FIG. 3, a first insulating layer 90 may be further disposed between the second touch pattern layer 50 and the first touch pattern layer 40. As described above, the first touch pattern layer 40 may include a plurality of touch driving electrodes, and the second touch pattern layer 50 may include a plurality of touch sensing electrodes, in such case, the first insulating layer 90 insulates and separates the first touch pattern layer 40 from the second touch pattern layer 50; alternatively, one of the first touch pattern layer 40 and the second touch pattern layer 50 includes: driving electrode units and connecting portions of the touch driving electrodes, and sensing electrode units of the touch sensing electrode; the other of the first touch pattern layer 40 and the second touch pattern layer 50 includes: bridge portions of the touch sensing electrodes, and in such case, the bridge portions are connected to the touch sensing electrodes through via holes in the first insulating layer 90.

Figure 4:
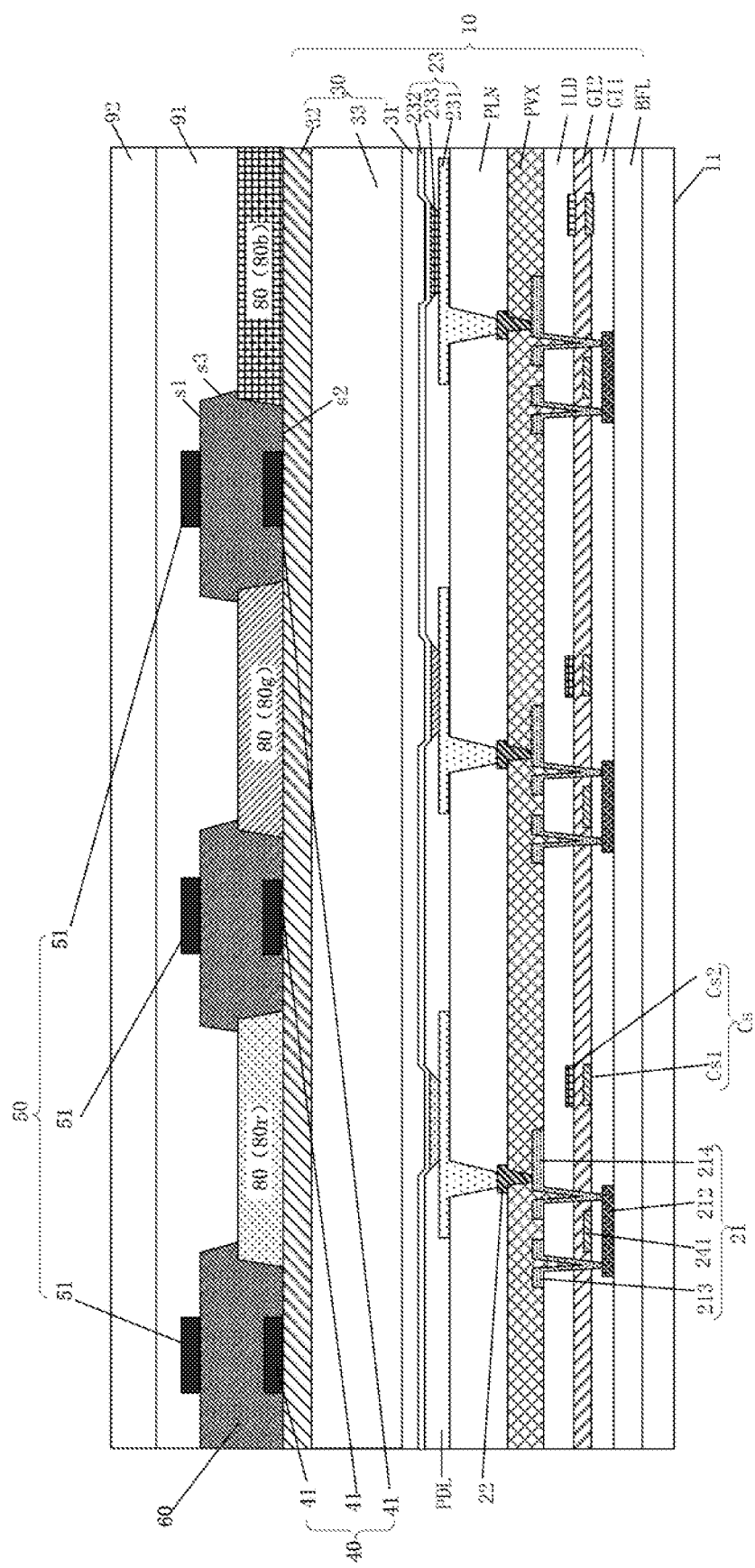
FIG. 4 is a schematic diagram of a touch display panel provided in the present disclosure.

FIG. 4 is a schematic diagram of a touch display panel provided in the present disclosure, and the touch display panel shown in FIG. 4 is similar to the touch display panel shown in FIG. 3, and includes: a display substrate 10, and a touch control structure layer, a black matrix 60, a plurality of pixel filter portions 80 and a cover layer 91 located on a light-exiting side of the display substrate 10. The touch control structure layer includes a first touch pattern layer 40 and a second touch pattern layer 50, the first touch pattern layer 40 includes a plurality of first metal lines 41, the second touch pattern layer 50 includes a plurality of second metal lines 51, and orthographic projections of the first metal lines 41 and the second metal lines 51 on the display substrate 10 are both located within an orthographic projection of the black matrix 60 on the display substrate 10. The differences between structures shown in FIG. 4 and FIG. 3 are described below.

As shown in FIG. 4, the second touch pattern layer 50 is located on a side of the first touch pattern layer 40 away from the display substrate 10, and the black matrix 60 is located between the first touch pattern layer 40 and the second touch pattern layer 50. Thus, the first touch pattern layer 40 and the second touch pattern layer 50 can be spaced apart from each other by the black matrix 60, and it is unnecessary to additionally manufacture an insulating layer between the first touch pattern layer 40 and the second touch pattern layer 50.

In a case where the second touch pattern layer 50 is located on a side of the black matrix 60 away from the display substrate 10, a refractive index of a surface of the second metal line 51 away from the display substrate 10 may be set to be less than 5%, so as to prevent the external ambient light from being reflected by the second metal line 51 to affect the display effect. In some examples, the second metal line 51 may include a lamination of a plurality of metal layers, one of the metal layers farthest from the display substrate 10 is a black metal layer, and at least one of the remaining metal layers is a metal layer having a relatively high conductivity, for example, the second metal line 51 may be a lamination of MoOx/Al/Ti or a lamination of MoOx/Al/MoOx, and the refractive index of the surface of the second metal line 51 is about 4.2%.

As shown in FIG. 4, the black matrix 60 includes: a first surface s1 facing away from the display substrate 10, a second surface s2 facing the display substrate 10, and a side surface connected between the first surface s1 and the second surface s2. Furthermore, the first surface s1 of the black matrix 60 is higher than a surface of the pixel filter portion 80 away from the display substrate 10 so that a portion of the side surface of the black matrix 60 contacts the cover layer 91, and as shown in FIG. 4, the side surface of the black matrix 60 includes a first side sub-surface s3 contacting the cover layer 91. Moreover, a refractive index of a portion of the black matrix 60 close to the first side sub-surface s3 is less than a refractive index of the cover layer 91, so that light from the display substrate 10 irradiates to at least a portion of the first side sub-surface s3, and is totally reflected at the first side sub-surface s3, so as to be reflected by the first side sub-surface s3 towards a direction away from the display substrate 10, thereby improving the brightness of the touch display panel.

The first side sub-surface s3 may be an inclined plane, or may be an inward or outward curved surface, as long as at least a part of light emitted from the display substrate 10 can be totally reflected at the first side sub-surface s3.

In an example, the refractive index of the portion of the black matrix 60 close to the first side sub-surface s3 may range from 1.5 to 1.6, and the refractive index of the cover layer 91 may range from 1.7 to 1.8.

It should be noted that, in the touch display panel shown in FIG. 4, the black matrix 60 may have a black single-layered structure, for example, may be made of a black organic insulating material. Certainly, the black matrix 60 may also adopt the structure of the black matrix 60 in FIG. 2 (i.e., including the light shielding portion 63, the first filter pattern 61 and the second filter pattern 62), in such case, the first metal lines 41 are located on a side of the first filter pattern 61 close to the display substrate 10, and the second metal lines 51 are located on a side of the second filter pattern 62 away from the display substrate 10. Further, a refractive index of the light shielding portion 63 may be set to be greater than that of the cover layer 91 so that a surface of the light shielding portion 63 in contact with the cover layer 91 forms a total reflection surface.

The cover layer 91 in FIG. 4 may be the same as the cover layer 91 in FIG. 3, is an entire film layer.

Figure 5:
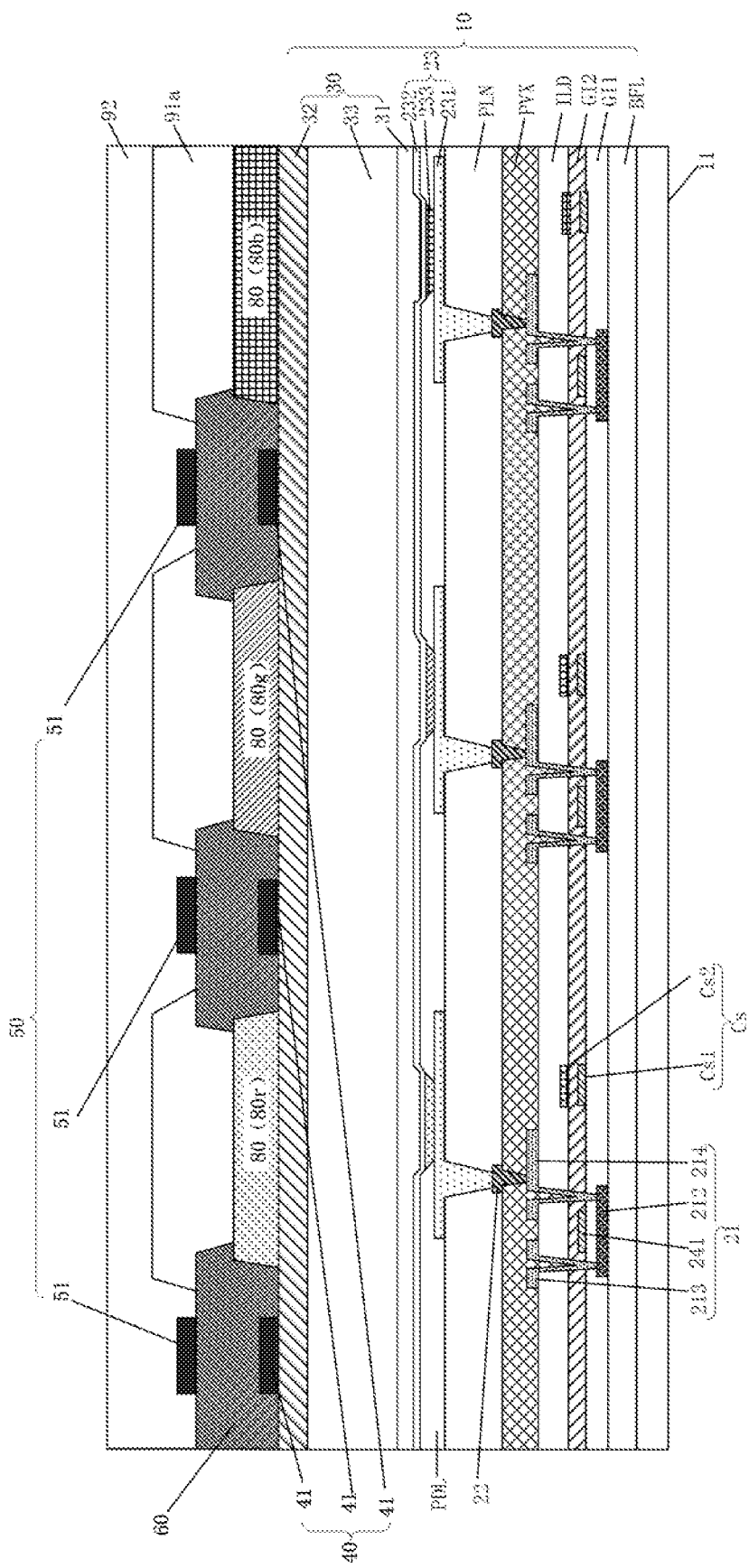
FIG. 5 is a schematic diagram of a touch display panel provided in the present disclosure.

FIG. 5 is a schematic diagram of a touch display panel provided in the present disclosure, and the touch display panel shown in FIG. 5 is similar to the touch display panel shown in FIG. 4, except that in FIG. 5, the cover layer 91 is no longer a continuous film layer, but includes a plurality of cover portions 91a arranged at intervals, and an orthographic projection of each cover portion 91a on the display substrate 10 covers at least one of the pixel regions.

The plurality of cover portions 91a may be formed using a photolithography patterning process.

Figure 6:
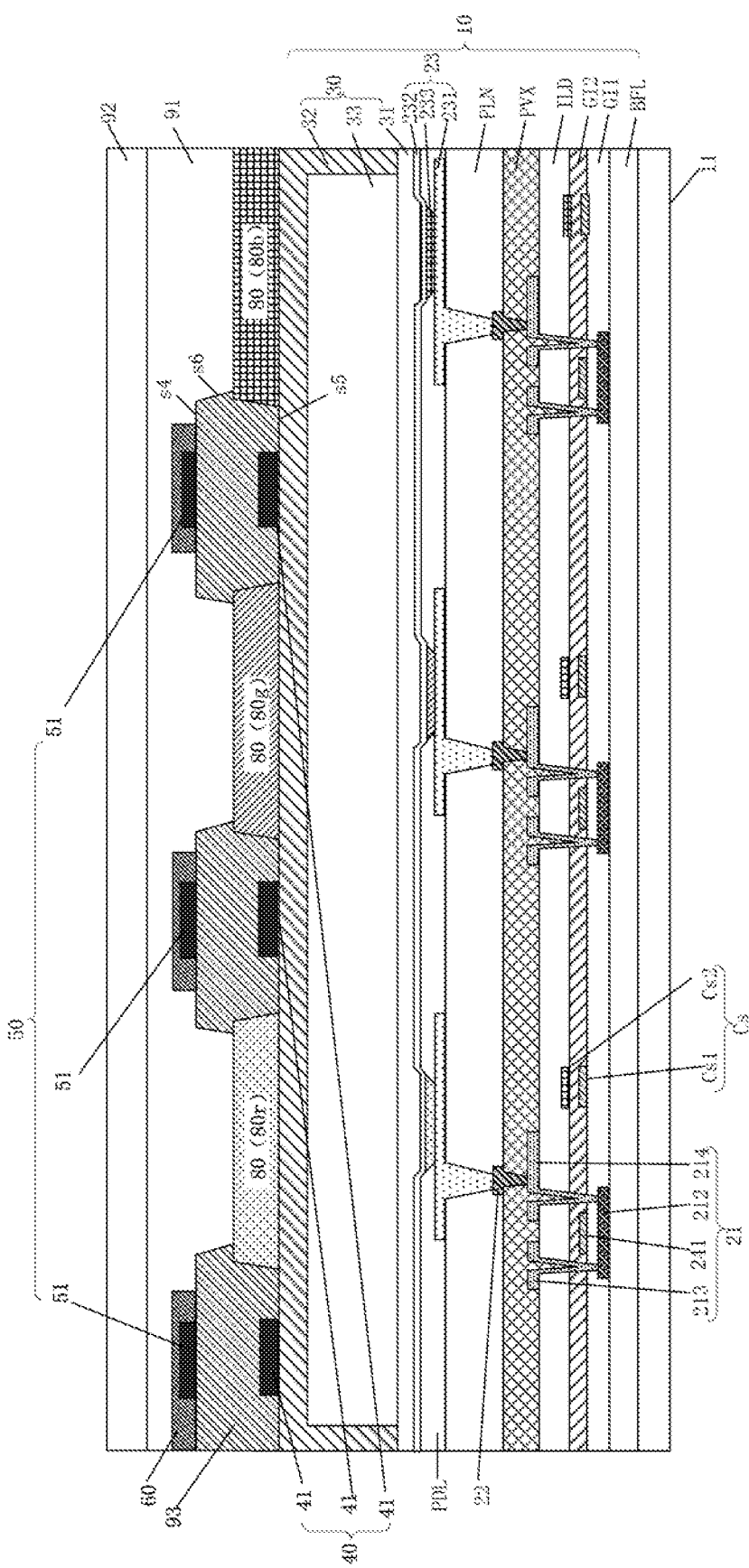
FIG. 6 is a schematic diagram of a touch display panel provided in the present disclosure.

FIG. 6 is a schematic diagram of a touch display panel provided in the present disclosure, the touch display panel shown in FIG. 6 is similar to that shown in FIG. 4, and includes: a display substrate 10, and a touch control structure layer, a black matrix 60, a plurality of pixel filter portions 80 and a cover layer 91 located on a light-exiting side of the display substrate 10. The touch control structure layer includes a first touch pattern layer 40 and a second touch pattern layer 50, the first touch pattern layer 40 includes a plurality of first metal lines 41, the second touch pattern layer 50 includes a plurality of second metal lines 51, and orthographic projections of the first metal lines 41 and the second metal lines 51 on the display substrate 10 are located within an orthographic projection of the black matrix 60 on the display substrate 10. A cover layer 91 is provided on a side of the black matrix 60 away from the display substrate 10, and an orthographic projection of the cover layer 91 on the display substrate 10 covers each pixel region. Differences between structures shown in FIG. 6 and FIG. 4 will be described below.

In FIG. 6, the second touch pattern layer 50 is located on a side of the first touch pattern layer 40 close to the display substrate 10, a second insulating layer 93 is arranged between the second touch pattern layer 50 and the first touch pattern layer 40, and an orthographic projection of the second insulating layer 93 on the display substrate 10 is located in the spacer region.

The second insulating layer 93 has a first surface s4 facing away from the display substrate 10, a second surface s5 facing the display substrate 10, and a side surface connected between the first surface s4 and the second surface s5. The side surface of the second insulating layer 93 includes a first side sub-surface s6 in contact with the cover layer 91. A refractive index of the second insulating layer 93 is less than that of the cover layer 91, so that at least part of light irradiated to the first side sub-surface s6 of the second insulating layer 93 from the display substrate 10 is totally reflected at the first side sub-surface s6, and is reflected by the first side sub-surface s6 towards a direction away from the display substrate 10.

In the touch display panel shown in FIG. 6, the first metal lines 41 and the second metal lines 51 are located on a side of the black matrix 60 close to the display substrate 10, and can not receive ambient light, and thus there is no particular limitation on reflectivities of the first metal lines 41 and the second metal lines 51, and materials of the first metal lines 41 and the second metal lines 51 may include or not include black metal.

In the touch display panel shown in FIG. 6, the cover layer 91 may be a continuous entire film layer, or may include a plurality of cover portions arranged at intervals.

Structures of display substrates 10 in FIGS. 4 to 6 are the same as those of display substrates 10 in FIGS. 1 and 2A, which can refer to the above description, and in FIGS. 4 to 6, all the pixel filter portions 80 may be in contact with the organic encapsulation sub-layer 33.

Figure 7:
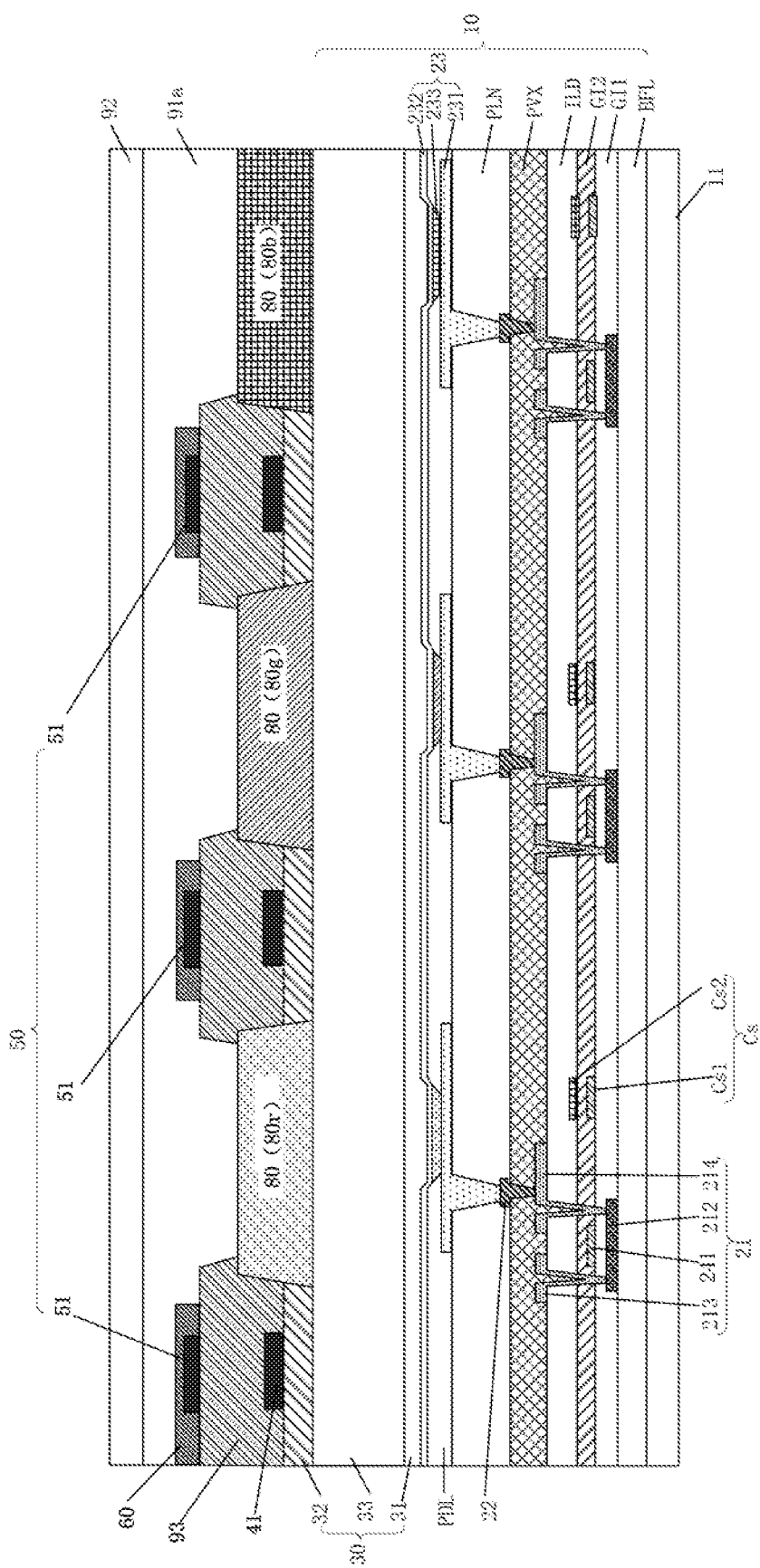
FIG. 7 is a schematic diagram of a touch display panel provided in the present disclosure.

FIG. 7 is a schematic diagram of a touch display panel provided in the present disclosure, and the touch display panel shown in FIG. 7 is similar to that in FIG. 4 except that, in FIG. 7, the second inorganic encapsulation sub-layer 32 in the display substrate 10 is no longer a continuous entire film layer, but has a plurality of hollow-out portions therein, each hollow-out portion corresponds to one of the pixel filter portions 80, and each pixel filter portion 80 is in contact with the organic encapsulation sub-layer 33 through the hollow-out portion corresponding thereto.

The second inorganic encapsulation sub-layer 32 and the first touch pattern layer 40 may be manufactured by two patterning processes, or may be manufactured by a single patterning process.

In the touch display panel shown in FIG. 7, the distance between the pixel filter portions 80 and the light emitting devices 23 is further reduced; in addition, the pixel filter portions 80 and the organic encapsulation sub-layer 33 both are made of an organic material, and refractive indexes of the pixel filter portions 80 and the organic encapsulation sub-layer 33 are relatively close to each other, so that the total reflection of light from the light emitting device 23 at an interface between the pixel filter portion 80 and the organic encapsulation sub-layer 33 can be reduced, and the light extraction efficiency can be improved. In an example, the refractive index of each pixel filter portion 80 and the refractive index of the organic encapsulation sub-layer 33 both range from 1.5 to 1.65.

In the touch display panel shown in FIG. 7, the cover layer 91 may be a continuous entire film layer, or may include a plurality of cover portions arranged at intervals.

In each of touch display panels shown in FIG. 4 to FIG. 7, an adhesive layer 92 and a cover plate may be further included, the adhesive layer 92 is located on a side of the cover layer 91 away from the display substrate 10, and the cover plate is located on a side of the adhesive layer 92 away from the display substrate 10 and is adhered to the adhesive layer 92. The adhesive layer 92 may be made of an optical adhesive, and the cover plate may be made of a glass substrate or a flexible substrate made of a flexible material. Certainly, touch display panels shown in FIGS. 1, 2A and 2C each may also include the adhesive layer and the cover plate.

It should be noted that each structure of the touch display panel in the above embodiments is only an exemplary embodiment adopted for illustrating the principle of the present disclosure, and it would be obvious to those skilled in the art that various improvements and modifications may be made without departing from the spirit and essence of the present disclosure. For example, for the touch display panels shown in FIGS. 4 to 7, the second touch pattern layer may be omitted, and the first touch pattern layer may be configured as a plurality of self-capacitance electrodes.

The embodiment of the present disclosure further provides a touch display device, which includes the touch display panel in any embodiment described above. The touch display device can be any product or component with a display function, such as an OLED panel, a QLED display panel, a mobile phone, a tablet computer, a television, a display, a notebook computer, a digital photo frame, a navigator and the like.

It will be understood that the above embodiments are merely exemplary embodiments employed to illustrate the principles of the present disclosure, and the present disclosure is not limited thereto. It will be apparent to those skilled in the art that various improvements and modifications may be made without departing from the spirit and scope of the present disclosure, and these improvements and modifications are to be considered within the scope of the present disclosure.

What is claimed is:

1. A touch display panel, comprising:
a display substrate comprising a plurality of pixel regions and a spacer region spacing the plurality of pixel regions apart from each other;
a black matrix located on a light-exiting side of the display substrate, an orthographic projection of the black matrix on the display substrate being located in the spacer region;
a touch control structure layer comprising a first touch pattern layer located on the light-exiting side of the display substrate, the first touch pattern layer comprising a plurality of first metal lines, wherein an orthographic projection of each first metal line on the display substrate is located in the orthographic projection of the black matrix on the display substrate, and the first metal lines are in contact with the black matrix; and
a plurality of pixel filter portions, wherein the pixel filter portions have various colors, and each pixel filter portion is arranged opposite to one of the pixel regions of the display substrate, wherein
the black matrix comprises a first filter pattern and a second filter pattern, the first filter pattern is located on a side, away from the display substrate, of the first touch pattern layer, the second filter pattern is located on a side, away from the display substrate, of the first filter pattern, and orthographic projections of the first filter pattern and the second filter pattern on the display substrate each cover an orthographic projection of the first touch pattern layer on the display substrate; the first filter pattern comprises a plurality of first filter portions, the second filter pattern comprises a plurality of second filter portions, and the first filter portions are arranged opposite to the second filter portions in a one-to-one correspondence manner; and
materials of the first filter portion and the second filter portion corresponding to each other are respectively the same as materials of the pixel filter portions of two colors.

2. The touch display panel of claim 1, wherein the black matrix is of a black single-layered structure.

3. The touch display panel of claim 1, wherein the black matrix further comprises a light shielding portion, the light shielding portion is of a black single-layered structure and is provided with a via hole therein, the first metal line and at least a portion of the first filter pattern are located in the via hole, and the first metal line is separated from the light shielding portion by the first filter pattern.

4. The touch display panel of claim 3, wherein at least a portion of the second filter pattern is outside the via hole, and a portion of an orthographic projection of the second filter pattern on the display substrate exceeds an orthographic projection of the via hole on the display substrate.

5. The touch display panel of claim 1, wherein the first filter portions of the first filter pattern have a same color, or, at least two of the first filter portions have different colors; and
the second filter portions of the second filter pattern have a same color; or, at least two of the second filter portions may have different colors.

6. The touch display panel of claim 1, wherein the first touch pattern layer is located on a side of the black matrix close to the display substrate, and the touch control structure layer further comprises:
a second touch pattern layer located on a side, away from the display substrate, of the black matrix and comprising a plurality of second metal lines, and an orthographic projection of each second metal line on the display substrate is located in the orthographic projection of the black matrix on the display substrate.

7. The touch display panel of claim 6, wherein a refractive index of a surface of the second metal line away from the display substrate is less than 5%.

8. The touch display panel of claim 1, further comprising a cover layer, wherein an orthographic projection of the cover layer on the display substrate covers each of the pixel regions,
the black matrix has a first surface facing away from the display substrate, a second surface facing the display substrate and a side surface connected between the first surface and the second surface, the side surface of the black matrix comprises a first side sub-surface in contact with the cover layer, and a refractive index of a portion of the black matrix close to the first side sub-surface is less than that of the cover layer, so that at least part of light irradiated to the first side sub-surface from the display substrate is reflected by the first side sub-surface towards a direction away from the display panel.

9. The touch display panel of claim 8, wherein the cover layer is a continuous film layer;
or, the cover layer comprises a plurality of cover portions arranged at intervals, and an orthographic projection of each cover portion on the display substrate covers at least one of the pixel regions.

10. The touch display panel of claim 1, wherein the first touch pattern layer is located on a side of the black matrix close to the display panel, the touch display panel further comprising:

a second touch pattern layer located on a side, close to the display substrate, of the first touch pattern layer and comprising a plurality of second metal lines, and an orthographic projection of each second metal line on the display substrate is located in the orthographic projection of the black matrix on the display substrate;

an insulating layer located between the first touch pattern layer and the second touch pattern layer, and an orthographic projection of the insulating layer on the display substrate is located in the spacer region.

11. The touch display panel of claim 10, further comprising: a cover layer, wherein an orthographic projection of the cover layer on the display substrate covers each of the pixel regions, the insulating layer has a first surface facing away from the display substrate, a second surface facing the display substrate and a side surface connected between the first surface and the second surface, the side surface of the insulating layer comprises a first side sub-surface in contact with the cover layer, and a refractive index of the insulating layer is less than that of the cover layer, so that at least part of light irradiated to the first side sub-surface from the display substrate is reflected by the first side sub-surface towards a direction away from the display substrate.

12. The touch display panel of claim 11, wherein the cover layer is a continuous film layer;

or, the cover layer comprises a plurality of cover portions arranged at intervals, and an orthographic projection of each cover portion on the display substrate covers at least one of the pixel regions.

13. The touch display panel of claim 1, further comprising: a plurality of pixel filter portions, wherein each of the pixel filter portions is disposed opposite to one of the pixel regions of the display substrate, the display substrate comprises:
a base substrate;
a plurality of light emitting devices disposed on the base substrate, each pixel region being provided therein with one of the light emitting devices; and
an encapsulation layer arranged on a side, away from the base substrate, of the light emitting devices,
the plurality of pixel filter portions are in contact with the encapsulation layer.

14. The touch display panel of claim 13, wherein the encapsulation layer comprises: a first inorganic encapsulation sub-layer, an organic encapsulation sub-layer, and a second inorganic encapsulation sub-layer sequentially arranged in a direction away from the base substrate, the second inorganic encapsulation sub-layer is a continuous film layer, an orthographic projection of the second inorganic encapsulation sub-layer on the display substrate covers the plurality of pixel regions, and the plurality of pixel filter portions are in contact with the second inorganic encapsulation sub-layer;

or, the second inorganic encapsulation sub-layer is provided with a plurality of hollow-out portions therein, the hollow-out portions correspond to the pixel regions one by one, and at least a portion of the pixel filter portion is in contact with the organic encapsulation sub-layer through the hollow-out portion.

15. A touch display device, comprising the touch display panel of claim 1.

16. The touch display panel of claim 2, wherein the first touch pattern layer is located on a side of the black matrix close to the display substrate, and the touch control structure layer further comprises:

a second touch pattern layer located on a side, away from the display substrate, of the black matrix and comprising a plurality of second metal lines, and an orthographic projection of each second metal line on the display substrate is located in the orthographic projection of the black matrix on the display substrate.

17. The touch display panel of claim 2, further comprising a cover layer, wherein an orthographic projection of the cover layer on the display substrate covers each of the pixel regions, the black matrix has a first surface facing away from the display substrate, a second surface facing the display substrate and a side surface connected between the first surface and the second surface, the side surface of the black matrix comprises a first side sub-surface in contact with the cover layer, and a refractive index of a portion of the black matrix close to the first side sub-surface is less than that of the cover layer, so that at least part of light irradiated to the first side sub-surface from the display substrate is reflected by the first side sub-surface towards a direction away from the display panel.

18. The touch display panel of claim 2, wherein the first touch pattern layer is located on a side of the black matrix close to the display panel, the touch display panel further comprising:

a second touch pattern layer located on a side, close to the display substrate, of the first touch pattern layer and comprising a plurality of second metal lines, and an orthographic projection of each second metal line on the display substrate is located in the orthographic projection of the black matrix on the display substrate;

an insulating layer located between the first touch pattern layer and the second touch pattern layer, and an orthographic projection of the insulating layer on the display substrate is located in the spacer region.

19. The touch display panel of claim 2, further comprising: a plurality of pixel filter portions, wherein each of the pixel filter portions is disposed opposite to one of the pixel regions of the display substrate, the display substrate comprises:
a base substrate;
a plurality of light emitting devices disposed on the base substrate, each pixel region being provided therein with one of the light emitting devices; and
an encapsulation layer arranged on a side, away from the base substrate, of the light emitting devices,
the plurality of pixel filter portions are in contact with the encapsulation layer.

* * * * *